United States Patent
Zangooie et al.

(10) Patent No.: US 7,808,657 B2
(45) Date of Patent: Oct. 5, 2010

(54) WAFER AND STAGE ALIGNMENT USING PHOTONIC DEVICES

(75) Inventors: Shahin Zangooie, Hopewell Junction, NY (US); Lin Zhou, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 555 days.

(21) Appl. No.: 11/770,105

(22) Filed: Jun. 28, 2007

(65) Prior Publication Data

US 2009/0002721 A1  Jan. 1, 2009

(51) Int. Cl.
*G01B 11/14* (2006.01)
(52) U.S. Cl. .................. 356/620; 356/401; 356/614
(58) Field of Classification Search .......... 356/401, 356/620, 614
See application file for complete search history.

(56) References Cited

U.S. PATENT DOCUMENTS

| | | | |
|---|---|---|---|
| 5,696,629 A | 12/1997 | Berger et al. | |
| 5,920,078 A | 7/1999 | Frey | |
| 6,319,736 B1 | 11/2001 | Baklanov et al. | |
| 6,972,438 B2 | 12/2005 | Li et al. | |
| 7,024,066 B1 * | 4/2006 | Malendevich et al. | 385/14 |
| 2005/0251279 A1 | 11/2005 | Ray | |
| 2006/0279735 A1 * | 12/2006 | Van Haren et al. | 356/401 |

* cited by examiner

*Primary Examiner*—L. G Lauchman
(74) *Attorney, Agent, or Firm*—Cantor Colburn LLP; Ian MacKinnon (57) ABSTRACT

A position sensing system for an optical metrology system, includes a plurality of photonic devices distributed on a carrier for providing a photonic response when interrogated with a measuring light, wherein a collective photonic response from the plurality indicates the position of the carrier. A method and an optical metrology system are also provided.

16 Claims, 12 Drawing Sheets

| | Result Stack - Data Set 1 | | ☒ |
|---|---|---|---|
| | Film Name | Thick(Å) | Rough(Å) |
| 18 | Low | 700.0 | 0.0 |
| 17 | High | 400.0 | 0.0 |
| 16 | Low | 700.0 | 0.0 |
| 15 | High | 400.0 | 0.0 |
| 14 | Low | 700.0 | 0.0 |
| 13 | High | 400.0 | 0.0 |
| 12 | Low | 700.0 | 0.0 |
| 11 | High | 400.0 | 0.0 |
| 10 | Low | 700.0 | 0.0 |
| 9 | High | 400.0 | 0.0 |
| 8 | Low | 700.0 | 0.0 |
| 7 | High | 400.0 | 0.0 |
| 6 | Low | 700.0 | 0.0 |
| 5 | High | 400.0 | 0.0 |
| 4 | Low | 700.0 | 0.0 |
| 3 | High | 400.0 | 0.0 |
| 2 | Low | 700.0 | 0.0 |
| 1 | High | 400.0 | 0.0 |
| 0 | Si | | 0.0 |

| | Result Stack - Data Set 1 | | ☒ |
|---|---|---|---|
| | Film Name | Thick(Å) | Rough(Å) |
| 18 | Low | 800.0 | 0.0 |
| 17 | High | 500.0 | 0.0 |
| 16 | Low | 800.0 | 0.0 |
| 15 | High | 500.0 | 0.0 |
| 14 | Low | 800.0 | 0.0 |
| 13 | High | 500.0 | 0.0 |
| 12 | Low | 800.0 | 0.0 |
| 11 | High | 500.0 | 0.0 |
| 10 | Low | 800.0 | 0.0 |
| 9 | High | 500.0 | 0.0 |
| 8 | High | 500.0 | 0.0 |
| 7 | Low | 800.0 | 0.0 |
| 6 | High | 500.0 | 0.0 |
| 5 | Low | 800.0 | 0.0 |
| 4 | High | 500.0 | 0.0 |
| 3 | Low | 800.0 | 0.0 |
| 2 | High | 500.0 | 0.0 |
| 1 | Low | 800.0 | 0.0 |
| 0 | Si | | 0.0 |

WAFER AND STAGE ALIGNMENT USING PHOTONIC DEVICES

BACKGROUND OF THE INVENTION

1. Field of the Invention

The teachings herein relate to fabrication of semiconductors, and in particular, to wafer and stage alignment using photonic devices.

2. Description of the Related Art

Optical metrology is an integral and crucial part of semiconductor manufacturing. For example, optical metrology provides for characterization of a large number of complex structures and phenomena. Thickness, critical dimension, sidewall angle, doping, chemical properties, RIE lag, etch bias, focus and exposure feedback and feed forward are among the many measurements available today. Benefits of using optical metrology include non-invasive and fast measurement capabilities with relatively low cost of ownership. Several factors are critical to successful use of optical metrology techniques. For example, accurate wafer and stage alignment have to be realized prior to performing any measurements.

Figure 1:
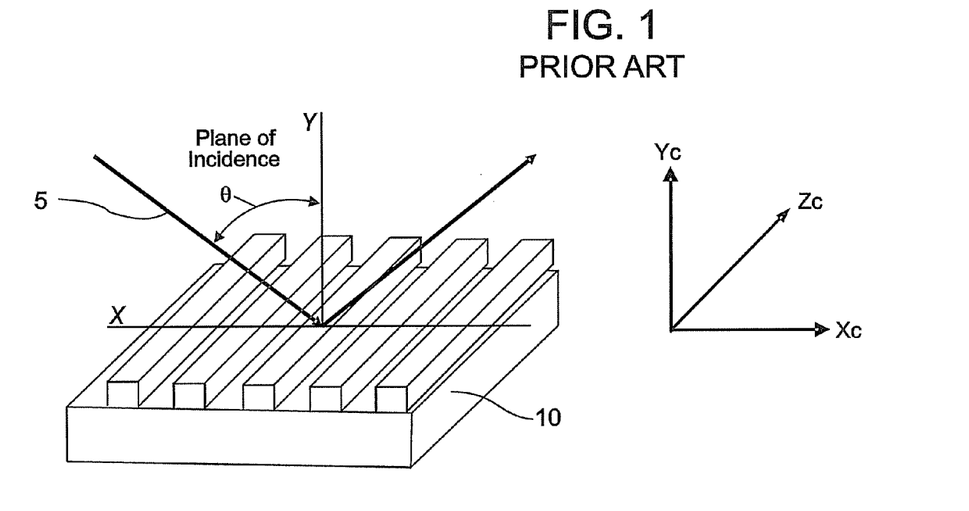
FIG. 1 depicts aspects of spectroscopic ellipsometry in a prior art optical metrology system.
Figure 2:
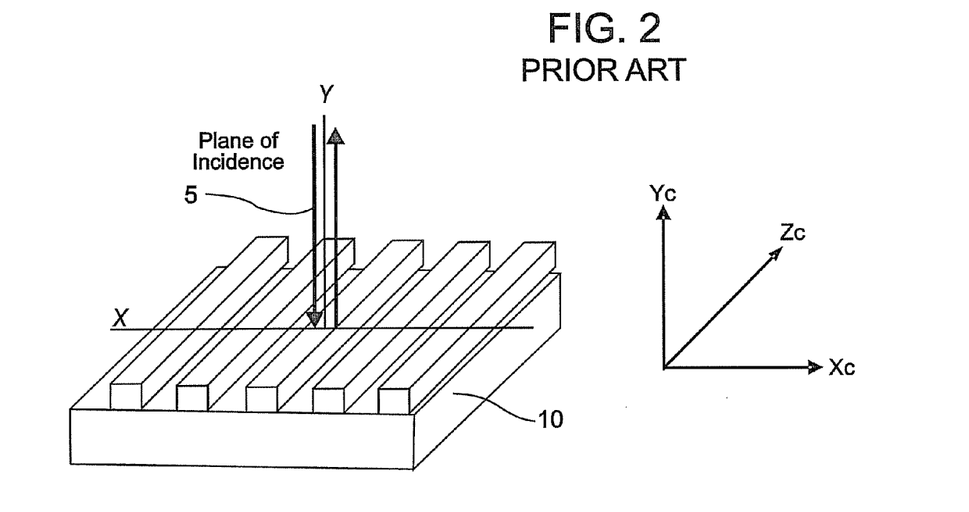
FIG. 2 depicts aspects of reflectometry in the prior art optical metrology system.

As a review, optical metrology generally employs at least one of spectroscopic ellipsometry and reflectometry. In spectroscopic ellipsometry, and with reference to FIG. 1, an incident beam of measuring light 5 illuminates a target 10 at an angle, θ. The angle, θ, is of a value that is other than normal to a surface of the target 10. Interrogation of the target 10 with measuring light 5 results in a spot (not shown). The spot resembles an ellipse. In reflectometry, and with reference to FIG. 2, the incident beam of measuring light 5 illuminates the target 10 normal to the surface of the target 10. In most optical systems, reflectometry results in a circular spot.

The optical systems used in spectroscopic ellipsometry and reflectometry to illuminate the sample and collect the optical spectra generally make use of and control various wavelengths and other parameters to improve measurement results. Regardless of which type of optical system is used, reflected measuring light must be analyzed to determine properties of the target 10. Analysis typically includes use of an optical model specifically created for the target being measured.

One skilled in the art will recognize that accurate determinations of properties of the target 10 require proper alignment of optical elements with the wafer. Accordingly, it is important to provide accurate alignment of the target 10 with a stage used for holding the target 10. Accuracy requirements call for a high level of wafer and stage alignment, as well as control of the flatness (of the stage and target 10).

What are needed are accurate techniques for performing alignment of a target wafer and a stage in an optical metrology system. Preferably, the techniques provide for determining a degree of flatness of the stage and the target wafer.

BRIEF SUMMARY OF THE INVENTION

Disclosed is a position sensing system for an optical metrology system, the sensing system including: a plurality of photonic devices distributed on a carrier for providing a photonic response when interrogated with a measuring light, wherein a collective photonic response from the plurality indicates the position of the carrier.

Also disclosed is a method for adjusting position of a stage in an optical metrology system, the method including: placing upon the stage a plurality of photonic devices, each of the devices for providing a photonic response when interrogated with a measuring light, wherein a collective photonic response from the plurality indicates a position of the stage; interrogating the photonic devices with the measuring light to determine position information for the stage; and adjusting the position of the stage according to the position information and a desired position for the stage.

Further disclosed is an optical metrology system including: a position sensing system including a plurality of photonic devices distributed on a carrier for providing a photonic response when interrogated with a measuring light, wherein a collective photonic response from the plurality indicates the position of the carrier; and components for receiving position information and adjusting the position of the carrier to a desired position.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 3A through FIG. 3F, collectively referred to herein as FIG. 3, depict aspects of performance of a Bragg optical filter;

FIG. 4A through FIG. 4C, collectively referred to herein as FIG. 4, depict aspects of performance of a Fabry-Perot optical filter;

The detailed description explains the preferred embodiments of the invention, together with advantages and features, by way of example with reference to the drawings.

DETAILED DESCRIPTION OF THE INVENTION

Disclosed is the use of photonic devices, such as those fabricated from porous silicon (PS), for sensing position of a target wafer 10 and a stage used for hosting the wafer 10 in an optical metrology system. The optical metrology system is generally used for measuring a variety of aspects of a wafer. The optical metrology system may include apparatus for using position information and at least one of correcting alignment and accounting for misalignment of the wafer 10.

Some general and non-limiting definitions are now supplied for convenience. The terms "target" and "wafer" generally refer to semiconductor substrates and semiconductor circuits built onto such substrate. Accordingly, as used herein, the terms "target" and "wafer" are generally interchangeable and apply to samples of semiconductor substrates and fabrications. It is considered that wafers are generally formed of a plurality of layers, such as thin films, using techniques as are known in the art. Aspects of wafers may be at least one of sampled and evaluated during and after fabrication. Aspects include film thickness, quality, presence, dimension(s), depth, angle, doping and other such aspects as are known in the art. The term "stage" makes reference to the portion of an optical metrology system that provides for retention of the wafer and subsequent measurement of properties of the wafer with an optical metrology system. The term "photonic device" and "photonic device target (PDT)" refers to a photonic device such as an optical filter (e.g., a Bragg filter, a Fabry-Perot filter) which is useful for reflecting wavelengths of measurement light.

As discussed herein, a "carrier" is used, among other things, to host the PDT. The carrier may include at least one of the wafer and the stage. In general, the PDT are evenly distributed on the carrier. When each of the PDT disposed on the carrier is interrogated with a measuring light, the PDT provide a photonic response. A collective photonic response (i.e., a response from each of the PDT in comparison to or in combination with responses of the other PDT) provides an indication of a position for the carrier.

One skilled in the art will recognize that the carrier may have multiple purposes. For example, as in the case where the wafer is the carrier, the wafer includes the PDT. Once metrology sequences have been completed, the PDT may be removed from the wafer (such as during subsequent wafer fabrication steps). In some embodiments, the PDTs may be placed on the stage 12 or a periphery of the stage 12.

Although use of porous silicon (PS) is discussed herein, one skilled in the art will recognize that other materials and devices with similar photonic characteristics can be used. Accordingly, use of porous silicon (PS) is merely illustrative and is not limiting of the teachings herein. Advantageously, porous silicon (PS) is known for its strong room-temperature photonic and electroluminescence properties. Further, porous silicon (PS) structures can be engineered to form narrow band optical filters such as Bragg reflectors and Fabry-Perot filters, aspects of which are described below.

A Bragg reflector is an optical mirror obtained by periodically stacking of two layers with high and low indices of refraction ($n_H$ and $n_L$). The thicknesses, $d_H$ and $d_L$, of the sublayers in each period follow the relations $d_L n_L = d_H n_H = \lambda/4$, where $\lambda$ represents the wavelength corresponding to a reflectance maxima. The porosity (void percentage and density) of the material determines associated optical constants. The porosity can be controlled by current density. Hence, periodic structures such as Bragg reflectors can be etched in the silicon substrate by simply alternating the applied current between high and low levels. High current density results in high porosity layers, whereas low current density provides high density low porosity layers. The porosity can also be controlled by doping type and level, illumination, crystal orientation and HF concentration.

A Fabry-Perot filter includes two mirror-imaged Bragg reflectors and it can be designed to produce double reflectance peaks in the spectral range of interest. The Fabry-Perot filter can be realized utilizing natural single layer mirrors such as metallic layers (Al, Cu, Cr, . . . ). However, using the Fabry-Perot filter as a photonic device target (PDT) can have the advantage that the filter can be engineered to exhibit a narrow bandwidth and large reflectance in the wavelength range of interest. Note that the associated reflectance peaks can provide magnified sensitivity to a large number of system parameters, such as angle of incidence (AOI).

These and other aspects of optical metrology systems are generally known to those skilled in the art. Accordingly, other components, such as light source(s), polarizer(s), beam splitter(s), mirror(s), lenses, analyzer(s), detector(s), processing system(s) and other components are not discussed in particular depth herein.

Regardless of which type of PDT is used in the optical metrology system, the reflected measurement beam includes information which must be analyzed and processed. Processed measurement data provides results regarding measured parameters. The results may be determined using an optical model specifically created for the target 10 being measured. However, for a better understanding of performance of a Bragg filter as well as a Fabry-Perot filter, FIGS. 3 and 4 are provided.

Exemplary data for a Bragg reflector fabricated of porous silicon (PS) are shown in FIG. 3. The data of FIG. 3A provide results for the Bragg reflector and corresponding angle of incidence reflectance dependency. FIG. 3A provides an example of a Bragg filter with single reflectance peak in the UV-NIR range. FIG. 3B through FIG. 3F provide corresponding reflectance curves. The reflectance curves are in terms of p-polarized and s-polarized spectra. The data are for angles of incidence of 0, 25, 50 and 75 degrees. Note that the reflectance properties of the filters are highly dependent upon an angle of incidence (AOI). The dependence may be used to quantify the stage tilt as the tilt does impact the effective angle of incidence of the probing beam. The sensitivity originates from the fact that deviation in the AOI from normal incidence gives rise to a blue shift of the reflectance peak. Maximum signal changes occur at both low and high WVL sides of the reflectance peak.

Figure 3A:
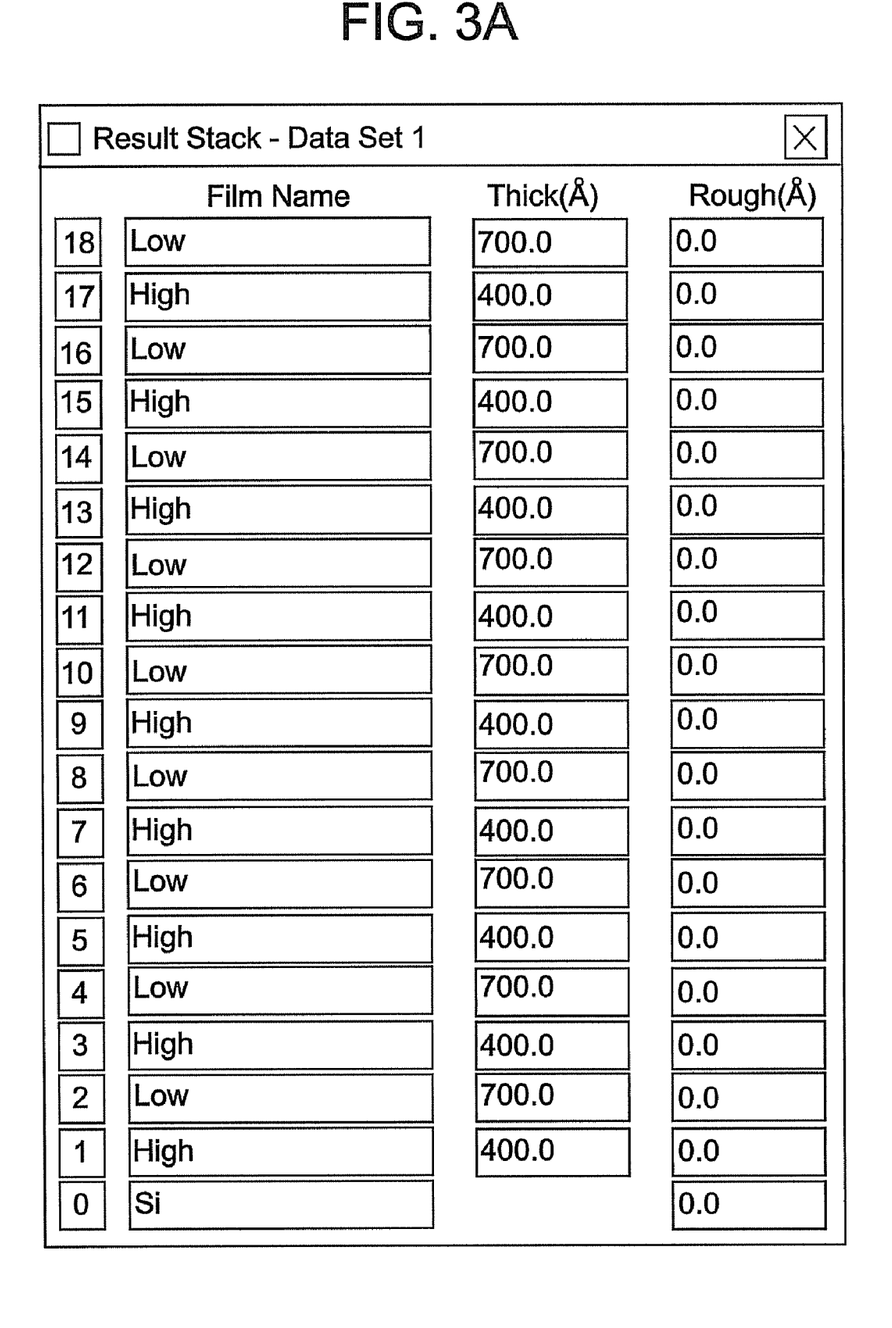
Figure 3B:
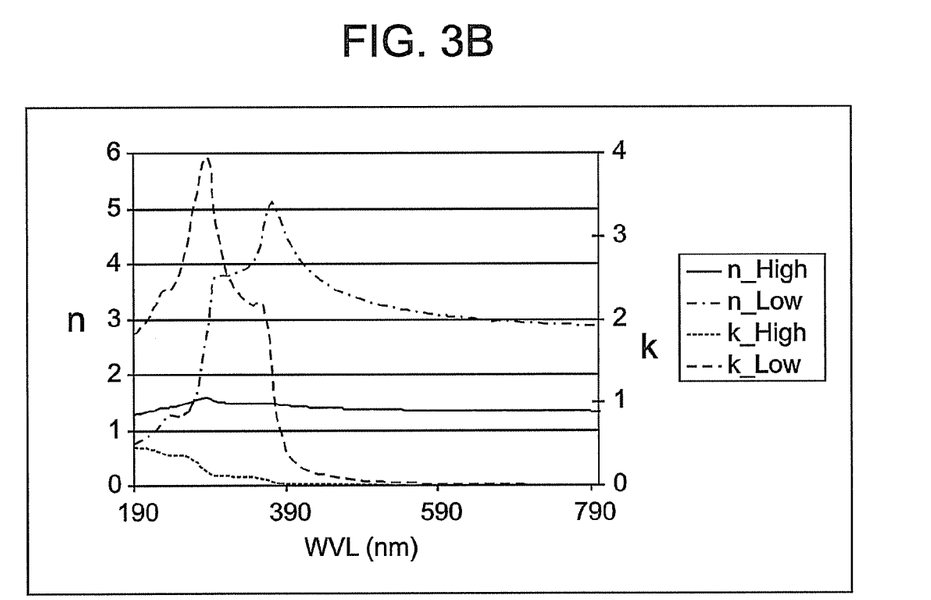
Figure 3C:
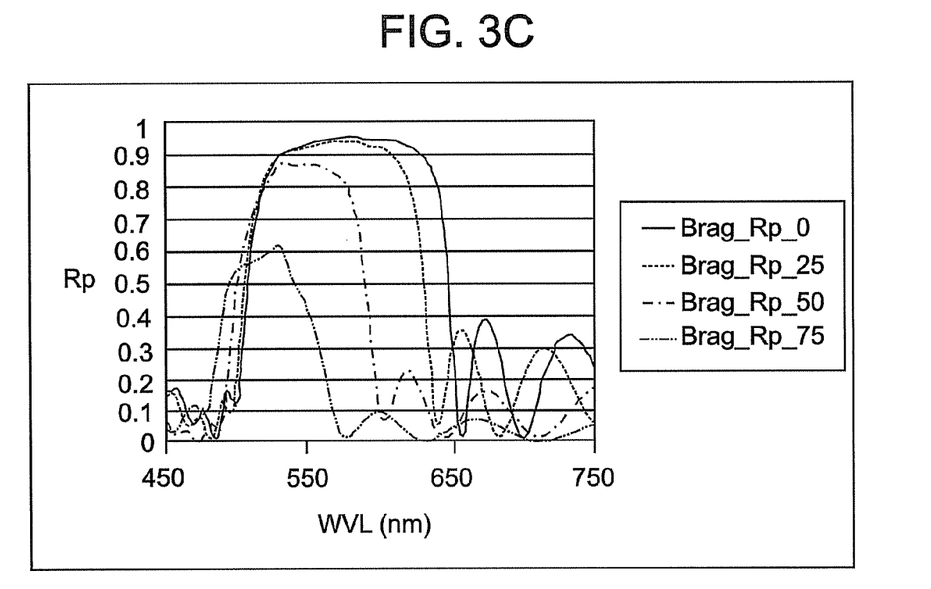
Figure 3D:
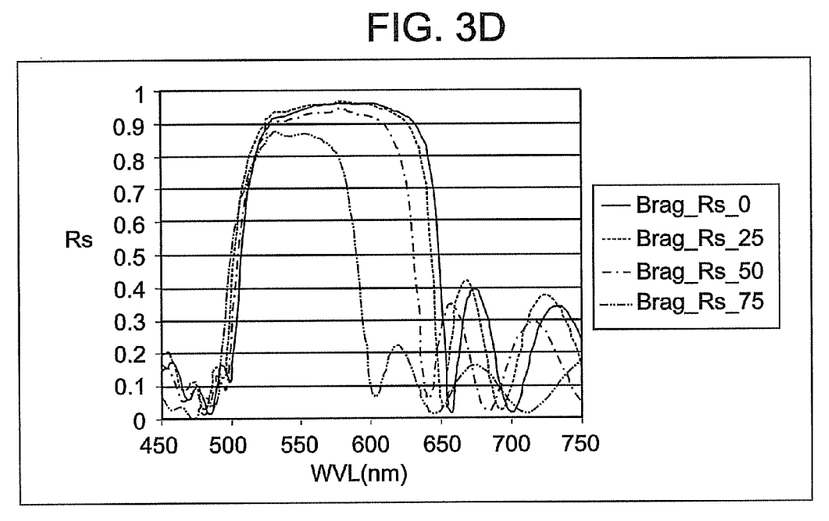
Figure 3E:
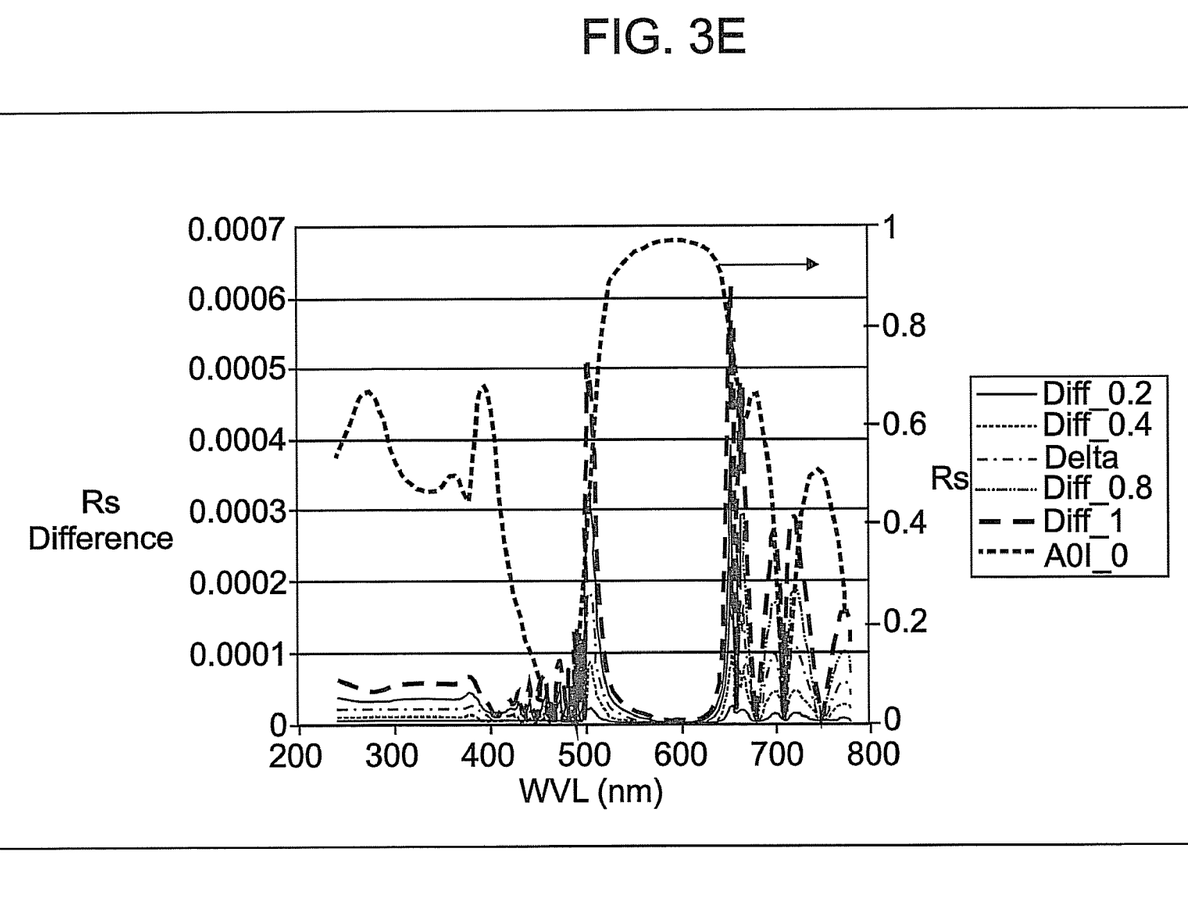
Figure 3F:
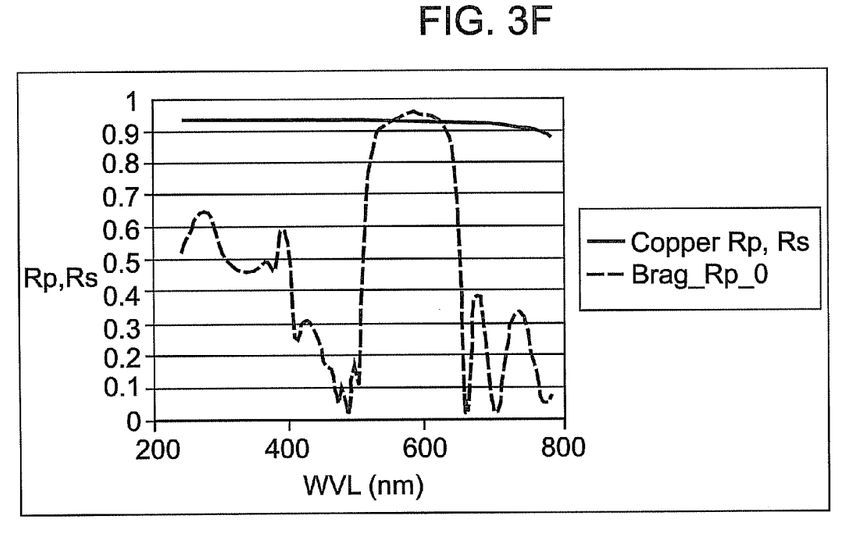

FIG. 3B shows dispersions of the low and high layers. FIGS. 3C and D show the plots represent s-polarized and p-polarized reflectance at angles of incidence of 0, 25, 50 and 75 degrees. The porosity of the low and high layers are 30 and 80 percent, respectively. FIG. 3E provides Rs difference plots considering AOI changes in the 0-1 degree interval with 0.2 degree steps. The largest changes appear at both the low and high wavelength ends of the reflectance peak. Note that the measurement sensitivity may also be a function of noise levels. For comparison, a reflectance curve for a copper substrate is also shown in FIG. 3F. Note that the reflectance curve for the copper is mostly flat and does not contain the sharp transitions available by designing a periodic PDT optical filter.

Figure 4A:
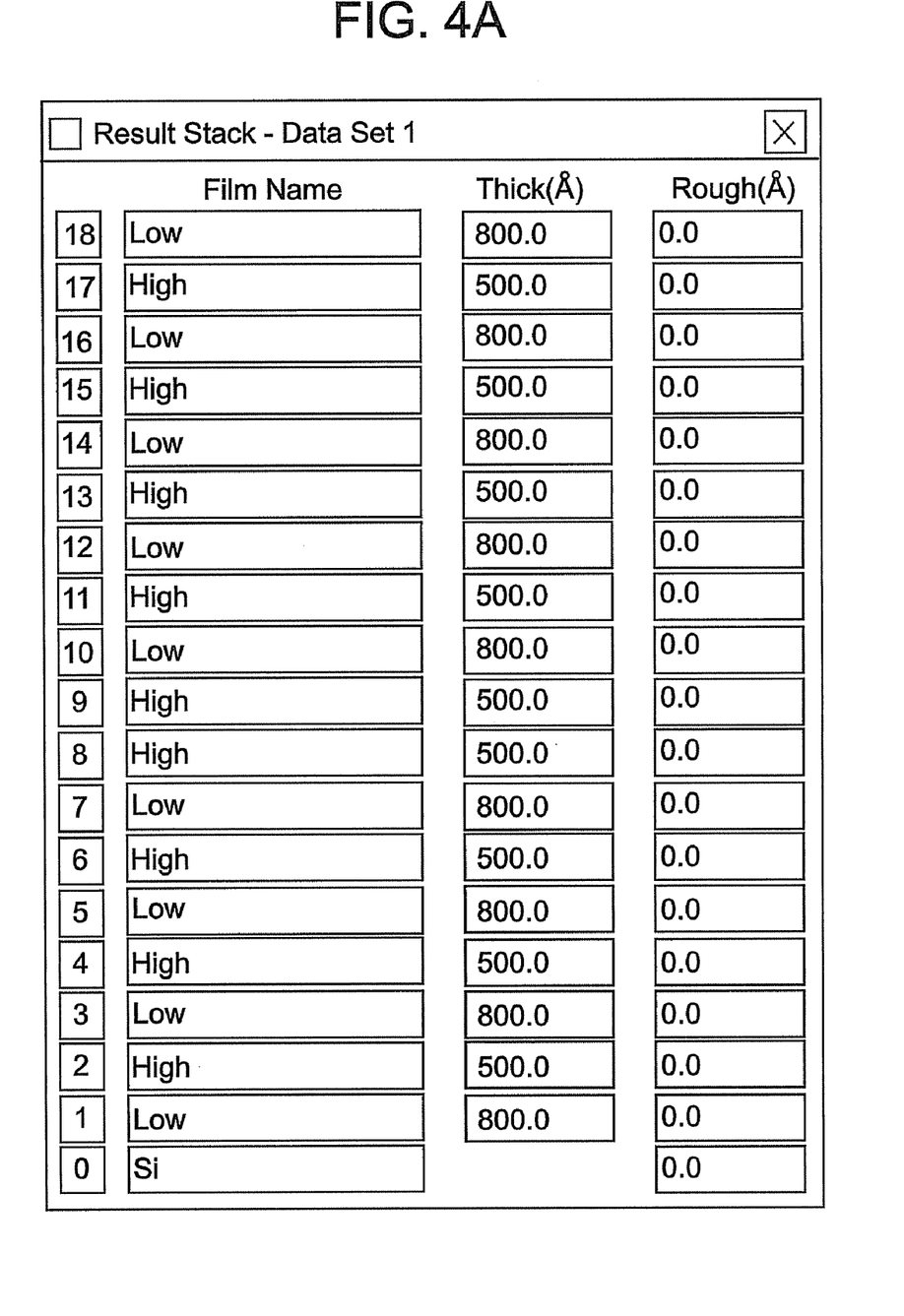
Figure 4B:
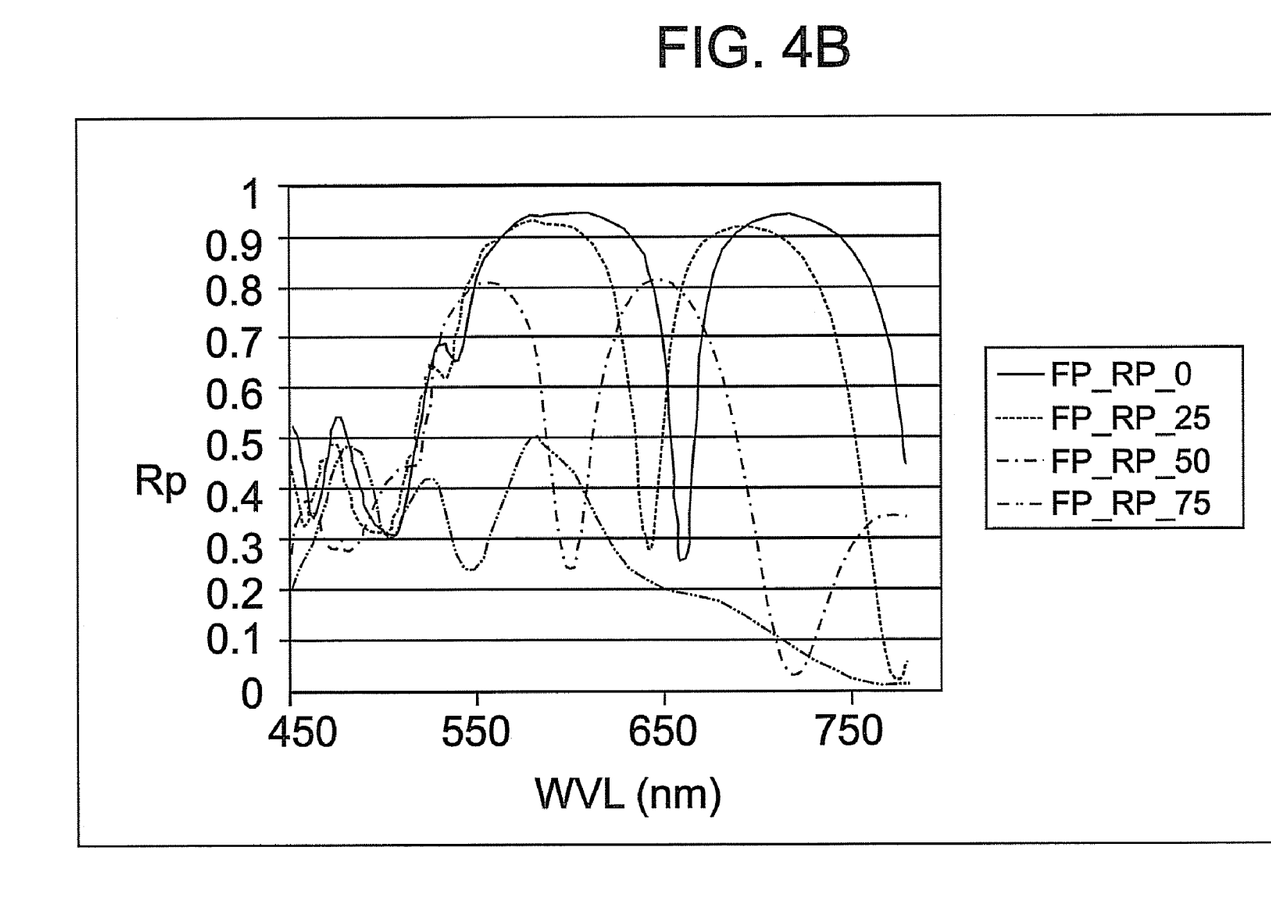
Figure 4C:
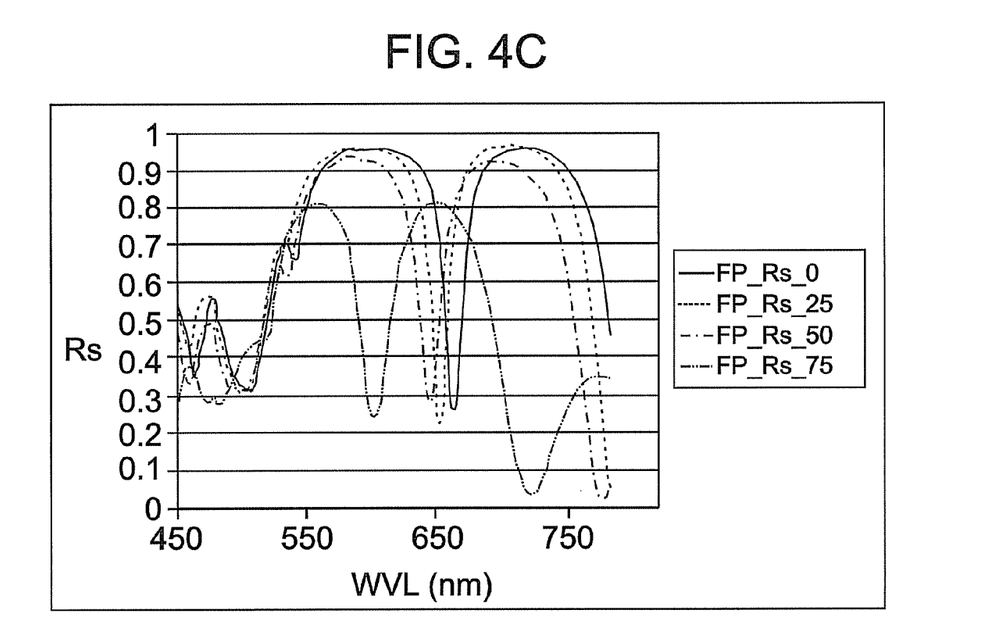

Exemplary aspects of performance for a Fabry-Perot filter fabricated of porous silicon (PS) are shown in FIG. 4. The reflectance curves of FIGS. 4B and 4C are in terms of p-polarized and s-polarized spectra. The data are for angles of incidence of 0, 25, 50 and 75 degrees. Note that the reflectance properties of the Fabry-Perot filters are highly dependent on the angle of incidence. It should be noted that the Fabry-Perot filter can be designed to have two nearly intense but separated reflectance peaks in the NIR-UV spectral range.

Figure 5:
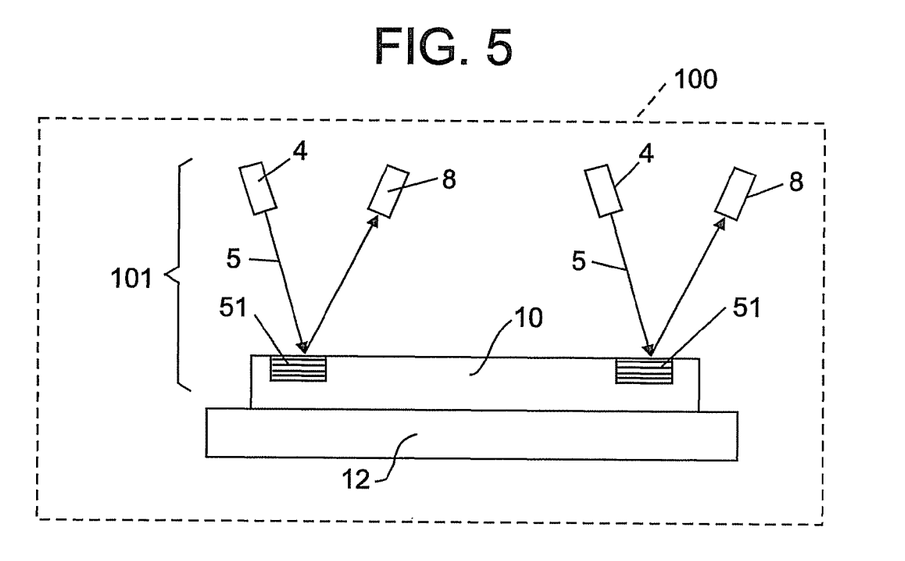
FIG. 5 depicts aspects of an optical metrology system according to the teachings herein.

From the foregoing review of Bragg filters and Fabry-Perot filters, one skilled in the art will recognize that these filters, as well as embodiments of other similar devices, may be used as photonic device targets (PDT) in an optical metrology system. Reference may be had to FIG. 5.

In FIG. 5, aspects of an embodiment of an optical metrology system 100 according to the teachings herein are depicted. The optical metrology system 100 includes at least one light source 4 for providing a measurement light 5, a plurality of Bragg filters (shown as "reflectors") 51, and at least one detector 8 for detecting reflected measurement light. As shown in FIG. 5, the Bragg reflectors are incorporated into the wafer 10 which is mounted on the stage 12. Collectively, the plurality of Bragg reflectors 51 work in conjunction with the capabilities of the optical metrology system 100 to provide a position sensing system 101. The position sensing system 101 provides for a high degree of accuracy and precision when placing wafers 10 upon the stage 12. That is, the position sensing system 101 may be used as a part of a feedback system for adjusting the position of the wafer 10 and the stage 12 within a high degree of precision and accuracy. Further aspects are depicted and discussed with relation to FIG. 6.

Figure 6:
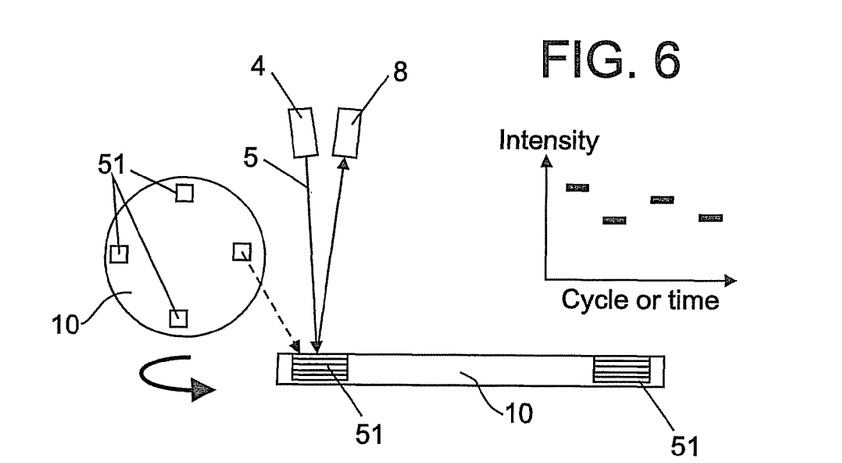
FIG. 6 further depicts aspects of the optical metrology system, as well as a response function.

In FIG. 6, alignment of the stage 12 and wafer 10 is realized by placing symmetrically positioned photonic device targets (PDT) on at least one of the stage 12 and the wafer 10. In the embodiment depicted, the photonic target devices (PDT) are Bragg filters 51 (i.e., reflectors). Other embodiments of PDT may be used. A flat and well aligned stage 12 and wafer 10 combination will yield nearly identical optical response from all the PDTs. As discussed earlier, PDTs such as Bragg filters are very sensitive to changes in the angle of incidence. Thus, by monitoring changes in the high or low wavelength sides of a reflectance peak, it is possible to quantify tilt and alignment of the stage 12 and the wafer 10.

One skilled in the art will recognize that the stage 12 rotates about a central axis (as indicated by the arrows showing rotation). The rotational movement of the stage 12 and the wafer 10 provide for interrogation of each of the PDTs with the measurement light 5. The interrogation may be performed on an ongoing basis.

In order to place PDTs on the wafer 10, the wafers 10 may be etched during initial or subsequent steps of the chip manufacturing process. Alternatively, PDTs may be deposited using other deposition techniques.

Now in greater detail, consider an embodiment where the light source 4 and the detector 8 work together with the PDT to provide a reflectometer that is nearly normal. By rotating the stage 12 (and a plurality of symmetrically placed PDTs) it is possible to record four reflectance signals per rotation of the stage 12. Exemplary signals are depicted in the graph provided as a part of FIG. 6. Note that a well aligned stage 12 will result in nearly identical responses from the PDTs. Using the alignment system 101 disclosed herein in conjunction with other controls for stage positioning, corrective adjustments to alignment of the stage 12 can be made during stage rotation.

In order to accurately determine the X-position and the Y-position of the stage 12 (and therefore the wafer 10), the PDTs may be placed symmetrically on at least one of the wafer 10 and the stage 12. The accuracy in the positioning will be influenced by the design and dimensions of the PDTs and the measurement system spot size (reference may be had to FIG. 6). Interpolation techniques may be employed to precisely pin improved positions after each scan. Initial target location requires combined azimuthal, X and Y movements of at least one of the stage 12 and the wafer 10 (R-θ). Alignment may also be achieved using photo luminescence properties of the PDTs. The light source 4 may include any one or more of a variety of types of light sources. For example, the light source 4 be a source of ultraviolet (UV) light. In general, wavelengths of light include bands or sets of wavelengths, which may be referred to as one of: UV-A, UV-B, UV-C, UV, visible (VIS), near infrared (NIR), infrared (IR) and long-wave infrared (LIR). Any wavelength of light deemed appropriate may be selected for scanning of the PDT.

Electro-luminescence may be used, for example, if a voltage is applied to the porous silicon PDT. Measurements may be performed in at least one of reflection and transmission modes. The PDTs can be placed on at least one of a front side and a back side of at least one of the stage 12 and the wafer 10. The PDTs disclosed herein (the Bragg filter and the Fabry-Perot filter) may be replaced by other components, such as simple reflective or metallic layers (i.e., mirrors), made of, for example, copper or aluminum and other forms of silicon and nitrogen, such as silicon nitride ($Si_3N_4$). These mirrors could be deposited using, for example, different sputtering techniques.

Figure 7:
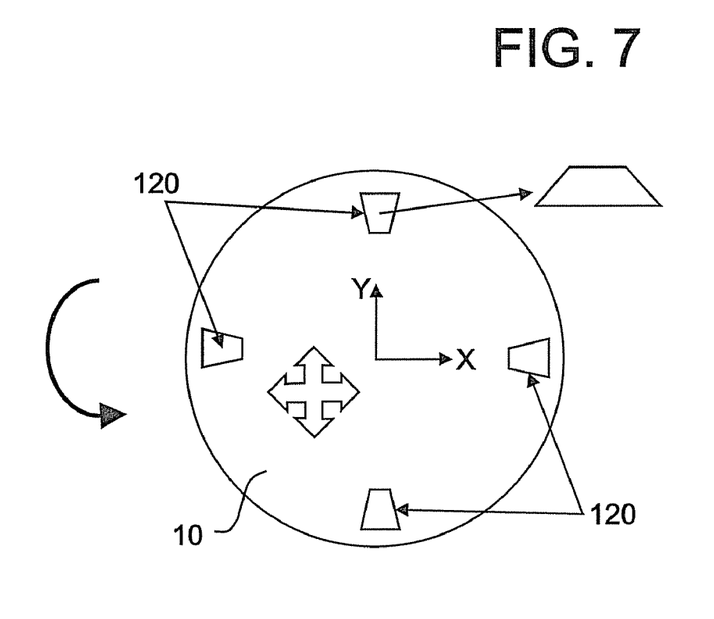
FIG. 7 depicts use of laterally graded photonic device targets (PDT) on a wafer.
Figure 8:
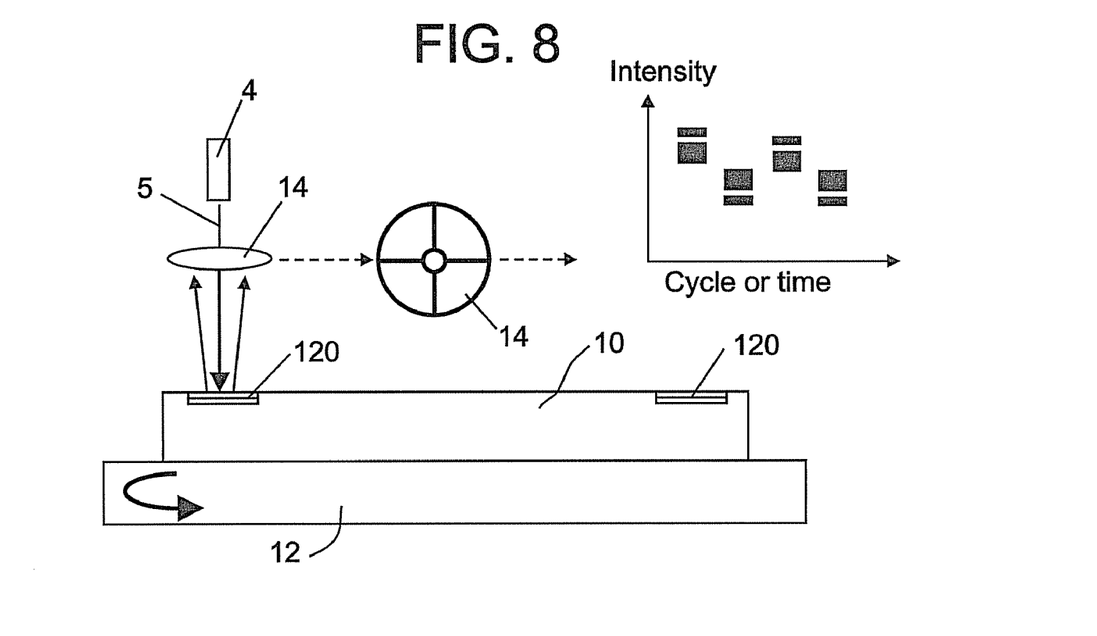
FIG. 8 depicts a quad cell detector system.

Because the reflected light from a luminescent device is not well collimated, some embodiments may use a quad cell detector arrangement similar to the one shown in FIG. 8. In FIG. 8, a quad cell detector 14 is provided. The quad cell detector 14 gives rise to four distinct intensity signals anytime the quad cell detector 14 passes over a PDT 120. Good alignment calls for convergence of all four detected intensities per cycle. Note that the arrangement in FIG. 8 may also be applied to the PDT structure shown in FIG. 7.

Figure 9:
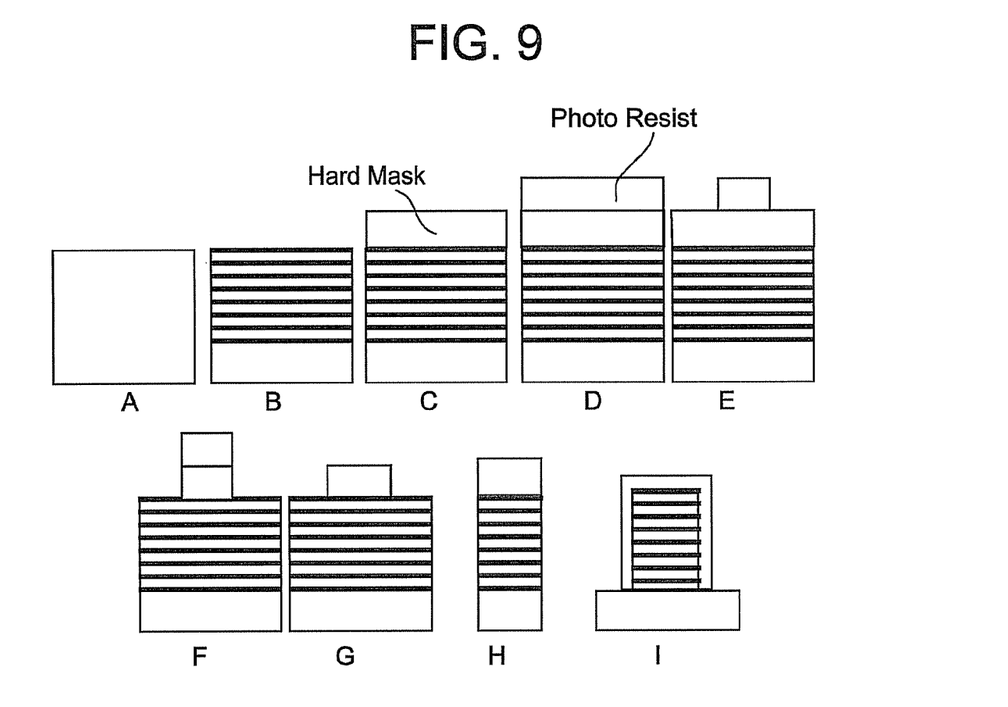
FIG. 9 and FIG. 10 depict steps in manufacturing processes for fabrication of the PDT.

The PDT gradients shown in FIG. 7 could be replaced with angle of incidence cutoff structures for the PDT 120. The sharp edges of the structures provide for a sudden change in the angle of incidence (AOI) during scanning of the wafer 10. Hence, a larger positioning accuracy can be achieved by designing cutoff targets for the AOI. FIG. 9 illustrates an exemplary method of manufacturing such targets and the structures that result in each step. With regard to FIG. 9, FIG. 9A depicts a clean silicon substrate provided in a first step. In FIG. 9B, electrochemical etch in HF is depicted. Subsequently, a hard mask is deposited as shown in FIG. 9C. Then, photo resist is spin coat onto the hard mask as shown in FIG. 9D. Note that a BARC layer is not shown here. In FIG. 9E, the photo resist is exposed and etched. Then, as shown in FIG. 9F, the hard mask is etched. In FIG. 9G, RIE of the exposed PDT is completed. This is followed by hard mask coating deposition followed by trim as shown in FIGS. 9H and 9I.

Note that PDT AOI cutoff manufacturing may be considered to be similar to deep trench isolation processes. For example, SiN deposition can be performed at around 400° C. without altering characteristics of the porous silicon PDT 120.

Figure 10:
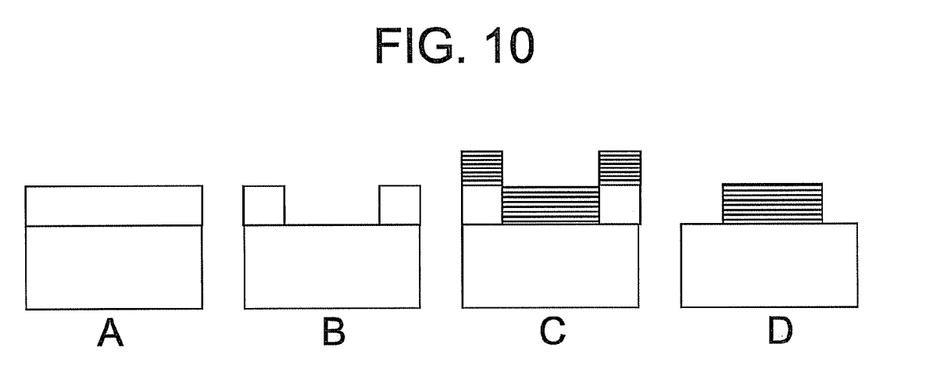

Note that the hard mask coating improves the stability of the PDT 120 structure and protects the structure against environmentally induced aging effects. Furthermore, the hard mask may be formed so as to be substantially transparent in the VIS-NIR spectral range. That is, the hard mask may be of negligible impact on an optical response of the underlying PDT 120. Note that the process may be replaced with other techniques such as sputter deposition and lift-off, as shown in FIG. 10, which provides certain advantages for deposition of PDT onto wafers 10. In FIG. 10A, a photoresist spin coat is applied. In FIG. 10B, the photoresist is exposed and etched. In FIG. 10C, sputter deposition is completed. In FIG. 10D, the photoresist is lifted.

Figure 11:
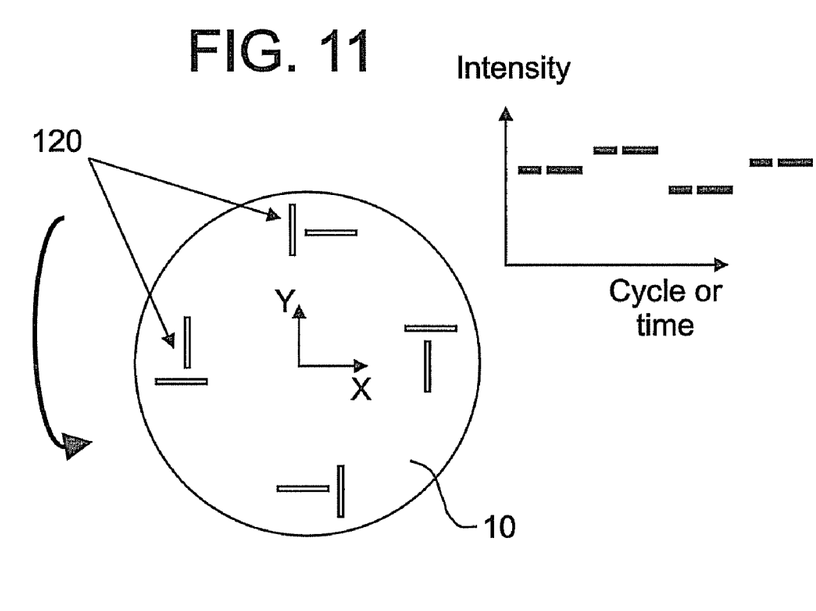
FIG. 11 and FIG. 12 depict further embodiments of PDT for position sensing.

Another embodiment of the PDT 120 is depicted in FIG. 11. This embodiment, referred to as a "radial position sensing" arrangement depicted ensures that accurate assessment of stage positioning in both the X and Y directions is determined. For example if the detection system only detects a short pulse but not a long pulse, it means that the wafer is not aligned properly in a radial direction. Hence, proper alignment is determined by the signal response from all of the PDTs 120. Other embodiments may be considered. For example, consider the embodiment of FIG. 12.

Figure 12:
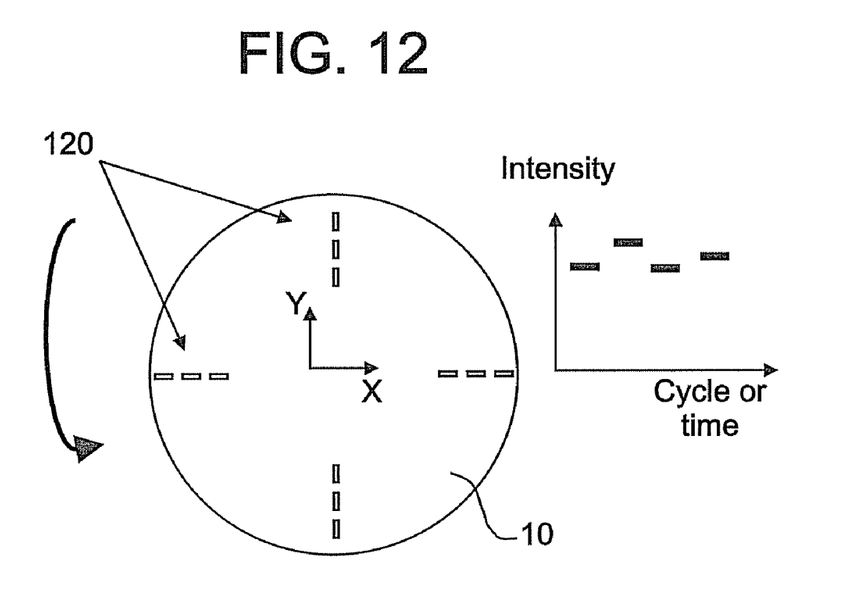

In FIG. 12, an embodiment referred to as a "radial grouping" arrangement is depicted. In FIG. 12, a triple AOI cutoff PDT group for accurate X and Y positioning and alignment of at least one of the stage 12 and the wafer 10 is provided. The middle targets depicted provide an optical signature (e.g., larger reflectance using a larger number of periods) than the other PDT 120. This facilitates identification of a centered position. The wafer 10 will be aligned properly when the incident light is reflected from each of the middle PDT 120.

One skilled in the art will recognize that coupling the detector 8 with appropriate processing capabilities, such as a computer or processor for processing machine readable and executable instructions stored on machine readable media may provide for rapid determinations of positioning of the stage 12 and the wafer 10. Position sensing information may be used as an input to position control apparatus, such as, for example, components used for at least one of tilting and adjusting a position of the stage 12.

Figure 13:
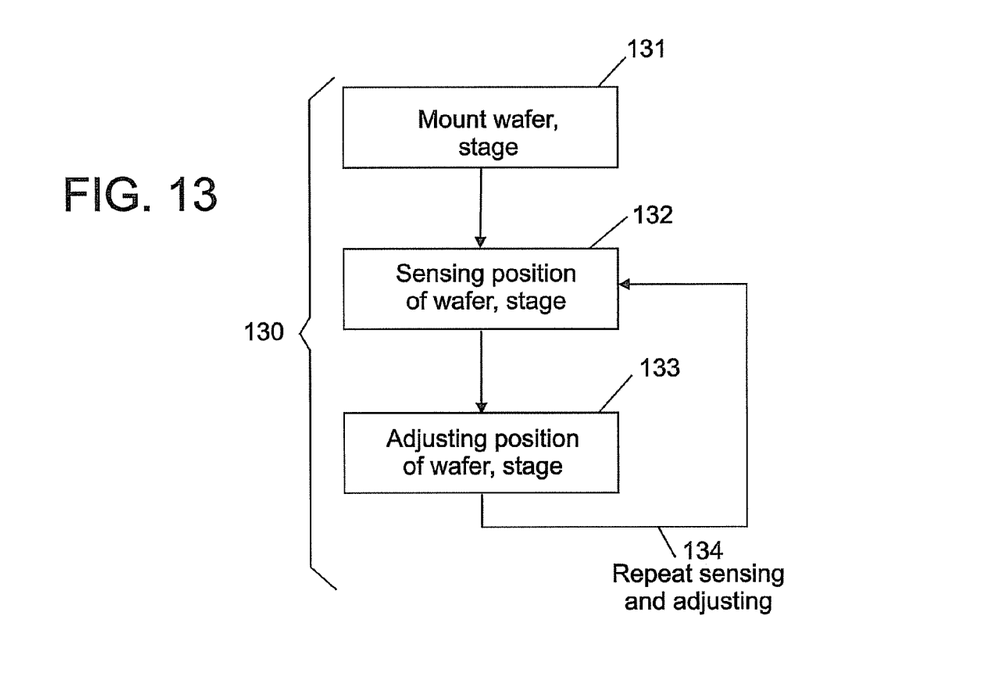
FIG. 13 provides an exemplary method for aligning the wafer.

FIG. 13 provides an exemplary method for wafer and stage alignment 130. In a step referred to as "placing" 131, at least one of a wafer 10 and a stage 12 having PDT 120 included thereon is provided. The providing calls for mounting the at least one of a wafer 10 and a stage 12 in an optical metrology system 100. In a step referred to as "position sensing" 132, the position sensing system 101 is operated for sensing position of the at least one of a wafer 10 and a stage 12. In a step referred to as "adjusting" 133, positioning information is used as an input to controls of the optical metrology system 100 and the position of the at least one of a wafer 10 and a stage 12 for adjusting position to improve alignment. In some embodiments, adjusting position is performed by comparing the sensed position to a desired position, and making appropriate position adjustments. In another step 134, the process of sensing and adjusting is repeated (and may be repeated on an ongoing basis during measurements). That is, sensing and adjusting may be performed while the stage 12 is rotated about a central axis. In some embodiments, instead of or in addition to position adjusting, output of the position sensing system 101 is used as an input to a correction algorithm. More specifically, the output may be used to provide for mathematical adjustment of measurements performed with the optical metrology system 100.

The above ideas can be utilized by any tool manufacturer or user where stage alignment needs to be monitored and maintained.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A position sensing system for an optical metrology system, the sensing system comprising:
   a plurality of photonic devices distributed on a carrier for providing a photonic response when interrogated with a measuring light, wherein a collective photonic response from the plurality indicates the position of the carrier; and
   the plurality of photonic devices arranged on the carrier in a linear configuration with respect to one another, and along a radial direction with respect to a center of the carrier, and wherein a middle one of the plurality of photonic devices has a different optical signature with respect to the others of the plurality of photonic devices so as to facilitate a determination of when the measuring light is incident upon the middle one of the plurality of photonic devices.

2. The position sensing system as in claim 1, wherein the carrier comprises at least one of a wafer and a stage.

3. The position sensing system as in claim 1, wherein the plurality of photonic devices comprises at least one of a Bragg filter, a Fabry-Perot filter and a reflective surface.

4. The position sensing system as in claim 1, wherein the plurality of photonic devices is fabricated from at least one of copper, aluminum, and forms of silicon and nitrogen.

5. The position sensing system as in claim 1, wherein the measuring light comprises wavelengths of at least one of UV-A, UV-B, UV-C, UV, visible (VIS), near infrared (NIR), infrared (IR) and longwave infrared (LIR).

6. The position sensing system as in claim 1, wherein at least a portion of the plurality comprises a protective encapsulation that is substantially transparent at a wavelength for the measuring light.

7. The position sensing system as in claim 1, further comprising an output to one of a position adjusting system and a correction algorithm.

8. The position sensing system as in claim 7, wherein the position adjusting system is adapted for aligning the carrier with the optical metrology system.

9. The position sensing system as in claim 1, wherein the response comprises one of absorption and reflection of the measuring light.

10. The position sensing system as in claim 1, comprising a quad cell detector adapted for recording at least one of reflected and transmitted light data.

11. A method for adjusting position of a stage in an optical metrology system, the method comprising:

placing upon the stage a plurality of photonic devices, each of the devices for providing a photonic response when interrogated with a measuring light, wherein a collective photonic response from the plurality indicates a position of the stage;

interrogating the photonic devices with the measuring light to determine position information for the stage; and adjusting the position of the stage according to the position information and a desired position for the stage;

wherein the plurality of photonic devices is arranged on the stage in a linear configuration with respect to one another, and along a radial direction with respect to a center of the stage, and wherein a middle one of the plurality of photonic devices has a different optical signature with respect to the others of the plurality of photonic devices so as to indicate when the measuring light is incident upon the middle one of the plurality of photonic devices.

12. The method as in claim 11, wherein placing comprises placing a wafer upon the stage.

13. The method as in claim 11, further comprising adjusting measurement results of the optical metrology system according to the position information.

14. The method as in claim 11, further comprising fabricating the photonic devices upon at least one of a wafer and the stage.

15. An optical metrology system comprising:

a position sensing system comprising a plurality of photonic devices distributed on a carrier for providing a photonic response when interrogated with a measuring light, wherein a collective photonic response from the plurality indicates the position of the carrier; and components for receiving position information and adjusting the position of the carrier to a desired position;

wherein the plurality of photonic devices is arranged on the carrier in a linear configuration with respect to one another, and along a radial direction with respect to a center of the carrier, and wherein a middle one of the plurality of photonic devices has a different optical signature with respect to the others of the plurality of photonic devices so as to facilitate a determination of when the measuring light is incident upon the middle one of the plurality of photonic devices.

16. The optical metrology system as in claim 15, wherein the components comprise a computer program product comprising machine executable instructions stored on machine readable media, the product comprising instructions for:

receiving the indication of the position; and adjusting the position of the carrier.

* * * * *